B. F. FIELD.
Wheel-Cultivator.
No. 40,095. Patented Sept. 29, 1863.
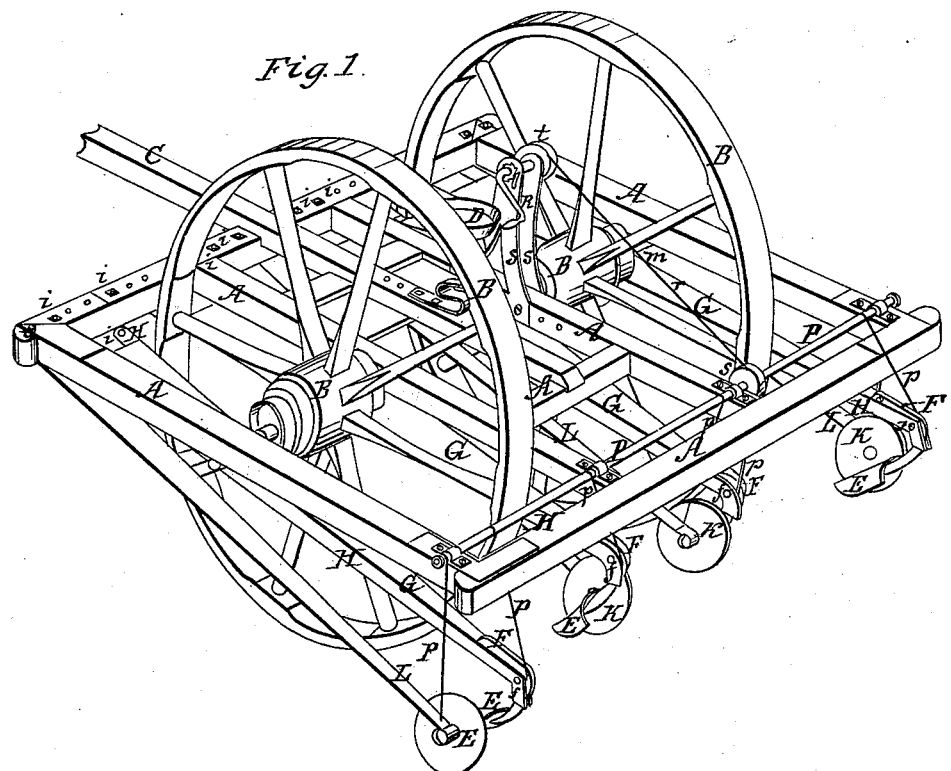
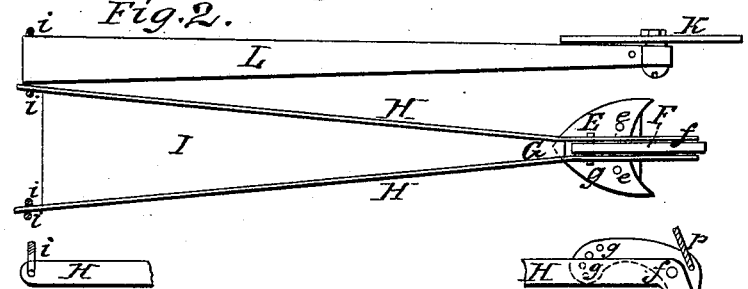
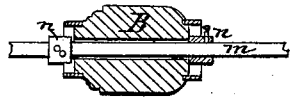
Witnesses:
Inventor:
Benjamin F. Field.

UNITED STATES PATENT OFFICE.

BENJAMIN F. FIELD, OF SHEBOYGAN FALLS, WISCONSIN.

IMPROVEMENT IN CULTIVATORS.

Specification forming part of Letters Patent No. 40,095, dated September 29, 1863.

*To all whom it may concern:*

Be it known that I, BENJAMIN F. FIELD, of Sheboygan Falls, in Sheboygan county, and State of Wisconsin, have invented a new and useful Improvement in Cultivators; and I do hereby declare that the following is a full, clear, and exact description thereof, reference being had to the annexed drawings, making a part of this specification, in which the same letters indicate the same parts in all the figures.

My invention consists in the peculiar construction and arrangement of the parts of cultivators, by means of which they may be used with greater facility and efficiency, and increased protection is afforded to the young plants cultivated, as will hereinafter be more fully set forth.

To enable others to make and use my invention, I will proceed to describe its construction and operation.

Figure 1 is a perspective view of my cultivator. Fig. 2 is a plan view of one cultivator-arm with plow attached and one shield with its arm annexed. Fig. 3 is a section of one wheel-hub, showing the adjustable collars upon the axle.

My apparatus is constructed as follows:

The frame A is constructed of any suitable material in the ordinary mode; but it is desirable to attach to the upper side of each corner of the outer frame a cast-iron plate for the purpose of adding strength and stiffness to the frame.

The horses are attached to the tongue C.

D is the driver's seat, which is adjustable forward or backward, so that the weight of the driver may be made to balance the machine properly.

E E are the cultivator-plows. The plows are made of pieces of sheet-steel pressed into the usual form of the shovel-plow. It is then attached to the cast-iron shank F, preferably by three plow-bolts, so that they may be readily removed in case of fracture, or in order to be replaced by larger or smaller ones. The shank F is pivoted at $f$ to the bifurcated arm G.

$g$ $g$ $g$ are a series of holes in the front end of the plow-shank F.

The proper inclination is given to the plow by means of a wooden pin inserted in one of the holes $g$ in the front end of the shank F, the ends of the said pin resting upon the upper edges of the strips H.

The arm G is constructed of wood and metal as follows: Two strips of iron, H H, two inches wide by one-quarter of an inch, and of the proper length, are firmly attached to the edges of a tapering strip of board, I, of about one inch in thickness. The wide end of I is ten or twelve inches, and the narrow end as wide as the thickness of the shank F. The iron strips project three or four inches beyond the wide end of the stiffening-board I, where they are provided with holes through which the staples $i$ pass, upon which the arms move vertically. The strips H project far enough beyond the narrow end of the stiffening-board I to embrace the horizontal portion of the shank F, to which they are attached by the pivot-bolt $f$. The rear ends of the strips H are bent downward, so as to increase the bearing of the shank F, and to prevent its vibration laterally. By means of the peculiar combination of wood and iron in the construction of the arm G, as above set forth, the utmost stiffness and strength consistent with the requisite lightness is attained, while its shape secures the least possible vibration.

The shield K is constructed either of a plain disk of sheet-iron or a disk of wood faced with iron, and pivoted to the arm L by any suitable device, so that it revolves freely on its center as it passes over the ground. The arm L is a thin bar of metal or other suitable material. It is preferably made wider at its front end, and pivoted there in the same manner as the arm G. It may be constructed in the same shape and manner as the arm G, in order to increase its bearing and to prevent its working sidewise; but not much strength is required, as it simply serves to draw the shield K over the ground.

The wheels are rendered adjustable on the shaft M by means of the collars $n$ $n$ at each end of the hubs, which are fixed in position on the shaft by means of set-screws $o$. By means of these collars and set-screws the wheels may be separated or placed nearer together, as desired, thus allowing the arms G and L to be adjusted sidewise to accommodate and adapt them to the width of the rows of the plants. This is accomplished by shifting the staples $i$ to other holes through the frame A, as shown in the drawings.

The cultivators and shields are rendered vertically adjustable by means of the cords or chains $p$, which are wound upon the shaft P, which in turn is operated and made to revolve by means of the cord or chain $r$, wound upon the pulley S on the shaft P, and the pulley $t$, attached to the crank R and supported by the standards $s\ s$. The standards $s\ s$ are adjustable, in order to adapt their position to that of the seat D of the driver.

On the handle side of the crank R is attached a ratchet and pawl, for the purpose of holding the crank and preventing its unwinding.

The operation of my machine is as follows: The horses being attached to the tongue C, the driver takes his seat and winds up the cord $r$ by turning the crank R. This raises the plows and shields clear of the ground, where they are held by means of the ratchet-wheel until the field is reached. The machine being driven into the field, one row of the plants passes between the horses and between the central shields, while one other row lies on each side of the machine. The cultivators and shields are now lowered to the ground. The plows throw the earth on each side; but the shields prevent any earth from being thrown against the young plants. This obviates the necessity of stopping frequently to relieve the young plants of heavy clods of earth which the plow often throws against them, and which would either distort the shape or destroy the young plant, if not relieved. This shield, being entirely separate from the plow, may be adjusted vertically or horizontally independently of it, as hereinafter shown, and thus the earth may be embanked to any height, while the plant itself may be protected. If the point of the plow meets an immovable obstruction, the wooden pin which is inserted in one of the holes $g$, will break, and the plow, being allowed to swing freely on its pivot $f$, passes over the obstruction without further damage. This pin may be replaced in a few seconds of time, and the apparatus will be in complete working order again. When it is desired to elevate the shields independently of the plows, this may be accomplished by means of shortening their chains or cords.

I am aware that the wheels of cultivators have been so constructed as to render them adjustable laterally; but this has been effected by means of keys or their equivalents running in grooves or slots turned on the axle, or by attaching the hub of the wheel inflexibly to the axle, which revolves with the wheel. These methods are objectionable, inasmuch as the grooves or slots only give a limited adjustment, requiring the wheels to be placed at certain points only, while in those machines in which the wheel and axle revolve together great difficulty is experienced in turning the machine around, owing to the inflexibility of the wheels and axle, whereas with my improvement the wheels may be fixed at any point on the axle, and at the same time they move freely and independently.

What I claim as my invention, and desire to secure by Letters Patent of the United States, is—

1. The arm or drag-bar G, when constructed as described.

2. The combination of the arm G, the cultivator E F, the independent rolling shield K, and the arm L.

3. The combination of the crank R, the pulleys $t$ and $s$, the shaft P, and the cords or chains $r$ and $p$, for the purpose of elevating the cultivators and shields.

4. Making the wheels of a cultivator adjustable on their shaft or axle by means of the collars $n\ n$ and set-screws $o$, substantially as set forth.

BENJAMIN F. FIELD.

Witnesses:
 JOHN S. HOLLINGSHEAD,
 C. O. WALL.